Jan. 14, 1969            G. WITTIG            3,421,377
DEVICE FOR REGULATING THE AIR PRESSURE IN A MOTOR-DRIVEN
MANUALLY GUIDED WORKING APPARATUS
Filed July 18, 1967

INVENTOR
GERHARD WITTIG

BY *Robert H. Jacob*

AGT.

United States Patent Office 3,421,377
Patented Jan. 14, 1969

3,421,377
DEVICE FOR REGULATING THE AIR PRESSURE IN A MOTOR-DRIVEN MANUALLY GUIDED WORKING APPARATUS
Gerhard Wittig, Munich, Germany, assignor to Hermann Wacker and Peter Wacker, Munich, Germany
Filed July 18, 1967, Ser. No. 654,267
Claims priority, application Germany, Sept. 2, 1966, W 42,329
U.S. Cl. 74—18.2     3 Claims
Int. Cl. F16j 15/50

ABSTRACT OF THE DISCLOSURE

Means for regulating the air pressure in motor-driven working apparatus having a guiding housing and a spring cylinder movable in the guiding housing with a bellows connecting the cylinder and the housing, where a suction valve keeps the interior of the apparatus under slight pressure to maintain the bellows in expanded condition, thereby preventing wear of the bellows, escape of oil and, consequently, wear of the lubricated parts of the equipment.

Background of the invention

The invention relates to working apparatus such as vibrating earth and ground working machines, particularly tamping equipment. More in particular the invention concerns a device for regulating the air presure inside a motor-driven manually guided machine of this type.

Tamping machines of the vibrating type are already known where the lubrication of the moved components of the vibrating system and the transmission is effected by oil lubrication. However, a prerequisite for the oil lubrication is that the machine or apparatus is completely sealed with respect to the outside so that no oil loss will occur. The compensation for the length variation due to the reciprocating operating movement of the tool is provided by an elastic bellows of folds that is arranged between the guiding cylinder and the work performing tool. As a result of the complete sealing of the apparatus or machine with respect to the outside and the continuous reciprocating working movement of the tool the pressure conditions inside the tool are variable. With the tool pushed out or extended, i.e. when the volume is increased, the pressure in the interior of the tool is subnormal, while the air is compressed durnig the return movement, so that excess pressure is produced. The natural consequence of this is that the bellows between the guiding cylinder and the working tool is blown up by the excess pressure while it is contracted or pulled in considerably by the subnormal pressure.

The normal function of the bellows is merely to provide the balancing for the length required as a result of the reciprocating movement of the tool in axial direction. However, the additional variable load in radial direction causes the bellows, or more particularly the material of which it is made to be subjected to excess wear, so that the bellows wears out quickly. The result of this is an immediate loss of oil, so that the moving parts of the equipment are no longer sufficiently lubricated and also they wear out rapidly.

Objects and advantages of the invention

It is an object of the invention to eliminate the aforementioned shortcomings in the equipment and to provide a solution which increases the lifetime of the equipment or machine and particularly of the bellows.

In accordance with the invention, the problem is solved in that arrangements are made to maintain continuously a slight excess pressure in the interior of the apparatus by providing a valve on the housing of the apparatus.

It is, therefore, a further object of the invention to provide such a valve in the form of a suction valve.

The advantage of this solution in accordance with the invention is that owing to the continuous slight excess pressure in the interior of the apparatus the pleat or fold bellows remains slightly blown up durnig each phase of the working movements of the apparatus so that it can no longer contract also during the outward thrust movement of the tool. As a consequence the bellows is no longer subjected to alternate radial push and pull loads as heretofore, but is only subjected to unilateral pressure, and that is reflected by a much longer lifetime of this component and also of the entire working equipment or apparatus.

Brief description of the drawings

Further advantageous features and objects of the invention will become apparent from the following description with reference to the accompanying drawings in which—

Description of the invention

Figure 1:
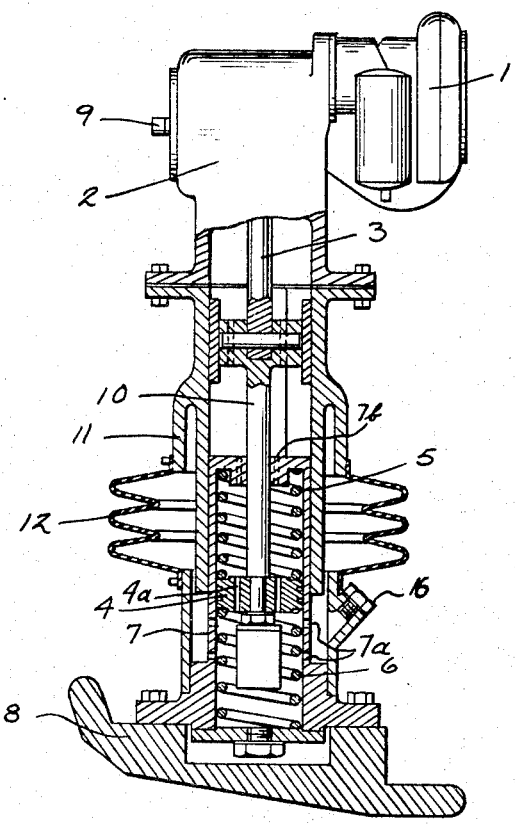
FIG. 1 is an over-all view of the working equipment in accordance with the invention partly in section.
Figure 2:
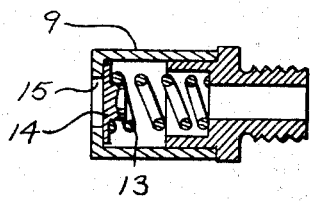
FIG. 2 is a sectional view of the suction valve.

The drive motor 1 imparts reciprocating movement to the connecting rod 3 by way of the transmission 2 which is provided with a crank drive. The connecting rod 3 is linked by means of a guide or piston rod 10 to the piston 4 which is biased by means of spring elements 5 and 6 against the bottoms or ends of the spring cylinder 7. The spring cylinder 7 is rigidly connected with the working tool 8. The elastic pleat bellows 12 is arranged between the spring cylinder 7 and the guiding housing 11. The suction valve 9 is of such construction that a spring 13 presses a seal 14 in the form of a disk against the intake aperture 15 of the suction valve 9. Of course the working equipment is fully sealed relative to the outside. Lubricating oil is contained in the spring cylinder 7 which is distributed in the form of an oily mist throughout the apparatus to lubricate the moving parts.

With the working tool pushed out, i.e. for the greatest thrust of the equipment a sub-normal pressure would develop due to the increase in volume and as a result of the complete seal the pleats of the bellows wuold be drawn in. In order to avoid this the suction valve 9 is provided on the housing of the equipment and which is constructed in a manner that with decreasing pressure in the interior of the equipment the sealing disk 14 opens the path for inflowing air by overcoming the pressure of spring 13. Thus the pressure is balanced. With the return movement of the working tool the decrease in volume causes a pressure on the sealing disk 14 so that it is pressed against the aperture 15 of the valve 9 and thus prevents the outflow of air.

The oil is filled into the spring cylinder 7 through the aperture closed by the filler screw 16. As the piston 4 reciprocates the oil becomes vaporized and passes through apertures 7a, 7b and 4a to the different components of the device which must be lubricated including the piston rod 10, the connecting rod 3, piston 4a, as well as the transmission to which the connecting rod 3 is joined. The hollow space in the bellows 12 is in communication with the interior of the machine and the suction valve 9 by way of the apertures, since the air cannot escape from the bellows, the pressure in bellows 12 and in the spring cylinder 7 or also in the transmission 2 is substantially the same.

Having now described the invention with reference to the embodiment illustrated in the drawings, I do not wish

I claim:

1. Means for regulaing the air pressure in a motor-driven manually guided working apparatus having a reciprocably movable working tool, a guiding housing, a rotary motor mounted above said guiding housing, and a spring cylinder slidably received in said guiding housing, a force transmitting piston in said spring cylinder, means including a connecting rod and a piston rod linking said motor to said piston, a bellows intermediate said guiding housing and said spring cylinder providing air tight sealing therebetween and sealing the interior of the housing relative to the outside, a valve connecting the interior of said apparatus with the outside to admit air to and maintain a slight excess air pressure in the interior of said apparatus and particularly in said bellows.

2. Means for regulating air pressure as set forth in claim 1 where said valve is a suction valve.

3. Means for regulating air pressure as set forth in claim 1, where said valve is a one way suction valve defined by a valve housing having an aperture, a disk disposed across said aperture and a spring in said valve housing biasing said disk against said aperture.

References Cited

UNITED STATES PATENTS

| | | | |
|---|---|---|---|
| 1,842,457 | 1/1932 | Mendenhall et al. | 74—18.2 XR |
| 3,090,286 | 5/1963 | Kestel | 173—118 XR |

FRED C. MATTERN, Jr., *Primary Examiner.*

F. D. SHOEMAKER, *Assistant Examiner.*

U.S. Cl. X.R.

173—118